Inventor:
Robert M. Elsworth,
by Howard & Schlanker
His Attorney.

Sept. 8, 1970 R. M. ELSWORTH 3,527,662
IMPREGNATION OF ELECTRICAL COILS USING RESISTANCE HEATING
AND TEMPERATURE SENSING MEANS
Original Filed Aug. 23, 1965 2 Sheets-Sheet 2

Inventor:
Robert M. Elsworth,
by Howard J. Khlansker
His Attorney.

United States Patent Office 3,527,662
Patented Sept. 8, 1970

3,527,662
IMPREGNATION OF ELECTRICAL COILS USING RESISTANCE HEATING AND TEMPERATURE SENSING MEANS
Robert M. Elsworth, Loudonville, N.Y., assignor to General Electric Company, a corporation of New York
Continuation of application Ser. No. 670,463, Sept. 25, 1967, which is a continuation of application Ser. No. 481,612, Aug. 23, 1965. This application Oct. 1, 1969, Ser. No. 864,284
Int. Cl. B44d 1/36
U.S. Cl. 117—232
6 Claims

ABSTRACT OF THE DISCLOSURE

The coils of electrical structures are impregnated with insulating coating and impregnating compositions by rotating the structure, resistance heating the coil by rotatable electric power means connected directly to said coils, sensing and controlling the temperature of the coils by infrared detecting and control means, applying a heat curable coating composition to the coils and curing through the medium of the electrical resistance heating.

---

Figure 1:
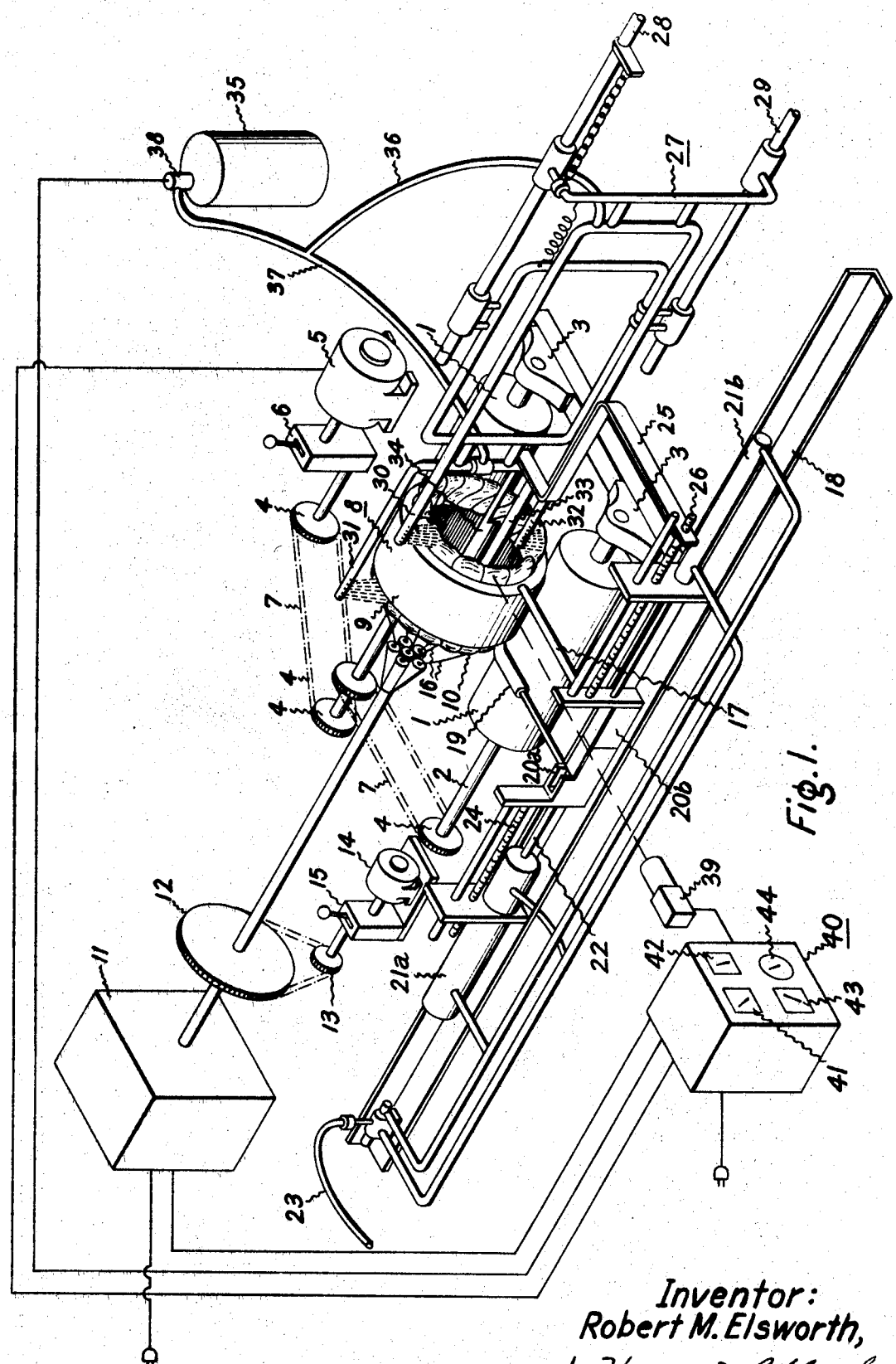

This application is a continuation of application Ser. No. 670,463, filed Sept. 25, 1967, now abandoned, which was a continuation of application Ser. No. 481,612, filed Aug. 23, 1965, now abandoned.

This invention relates to apparatus for impregnating structures such as components of electrical machinery with liquid coating and impregnating insulating materials such as varnishes.

The impregnation of electrical machinery components such as random wound stators has been accompanied by many improvements over the past years. However, the process time for impregnating the coils of such structures with insulating varnish has improved but very little. Typically, prior art methods of varnish treatment require an average of six to twelve hours per stator. Usually such stators are preheated, dipped in large tanks containing up to several hundred gallons of varnish, withdrawn, and the excess varnish allowed to drip off. The stators are then baked in ovens to evaporate solvents and solidify the varnish. Redipping is often necessary. Oftentimes, even after cooling, excess varnish must be removed from the stators and coils before use. The process requires a large investment in heating equipment, conveyor systems, dipping tanks and the like, as well as a large amount of labor and in process inventory. It will be quite obvious that improvements which would eliminate much of the above equipment and permit faster and more economical varnish treatment of such structures are much to be desired.

A principal object of the present invention is to provide apparatus for the varnish treatment of structures such as random coil wound stators of electrical machinery which is simple and economic of operation.

Briefly, the invention relates to improved means for coating and impregnating structures such as stators in which the temperature of the stator is precisely controlled. Means are provided for rotating the stator, and at the same time supplying electric resistance heating power, preferably from an alternating current supply through a rotating connection. Infrared detector or sensor means are provided which are directed to the stator to control the degree of heating, and time sequence apparatus is provided for timing the application of the preheating current. At the end of the selected preheating period, the time sequence means causes a previously selected amount of varnish to be dispensed. During the dispensing of the varnish, the infrared sensor means maintains the electric resistance heating current at either the preheat temperature or any other temperature desired for the particular insulating varnish to facilitate impregnation and the time sequence means times the operation. The alternating character of the resistance heating current produces in the random wound coils, if such are used, a pulsating motion which actually serves to pump the coating and impregnating varnish into the innermost recesses of the coil, eliminating voids and completely filling the coil structure. Direct current can be used where this action is not indicated. With the desired amount of varnish or insulating liquid applied, the time sequence means changes the resistance heating current to provide a suitable baking temperature for a period of time suitable for the particular liquid used. The entire process for a typical stator from the time it is mounted in the apparatus until it is completely cured and ready for installation is about fifteen minutes as compared to typical varnish treating times of about six to twelve hours for prior art processes.

Figure 2:
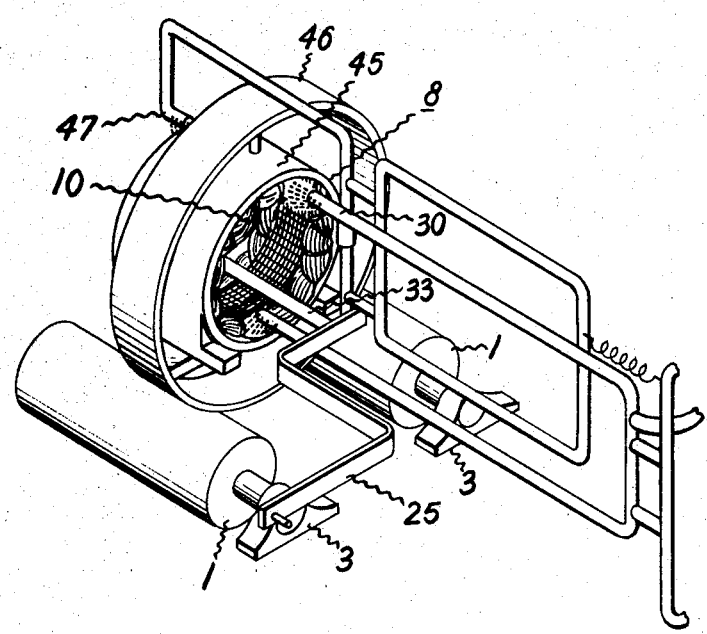

Those features of the invention which are believed to be novel are set forth with particularity in the claims appended hereto and the drawings in which FIG. 1 is a generalized perspective view of equipment for carrying out the invention, and FIG. 2 is a perspective view of a portion of the equipment adapted to varnish impregnating stators which are mounted within a frame.

Referring to FIG. 1 of the drawing, there is shown schematically a typical apparatus for coating and impregnating the coils of stators according to the present invention. Rotatable rollers 1 which are preferably coated with an electrically insulating friction material such as rubber and the like are mounted on axles 2 and trunnions 3 and are adapted as shown to be rotated through gears or pulleys 4 by means of an electric motor or other energy source through a variable speed control 6 and belts or chains 7 or other power train. It will be noted that the rollers or drums 1 are spaced to receive the stator 8 of an electrodynamic machine and more specifically to frictionally engage its outer frame 9, the stator also having internal laminations as shown and random wound coils 10. The coils 10 of the stator are adapted to be supplied with electric power through a rotating alternating current synchronous power supply shown generally at 11, through wires 16 connected to the coils 10, the power supply conductors and their conduit being rotated through pulleys or gears 12 and 13 by motor 14 or other power means having a variable speed control 15 which can be adjusted to rotate the power supply at the same speed at which the stator is rotated by the motor 5 through frictionally engaging rollers 1. Power means 11 is also adjustable vertically to position conductor 16 in line with stator 8. Mounted adjustably on a fixed support 18 is a stop 17 for limiting the lateral motion of the stator on rollers 1, this stop acting in coordination with movable stop 19 to hold the stator in position during treatment. Stop 19 is mounted on frame 20a which is connected to hydraulic or pneumatic cylinder 21a through rod 22, the hydraulic cylinder being actuated from a hydraulic or pneumatic source to which tube 23 is connected through the system shown. A threaded rod 24 mounted on frame 20 and fixed to cylinder 21a as shown permits adjustment of the relative positions of stop 19 and pneumatic cylinder 21a so that stator frames of varying size readily can be accommodated and held in position on rollers 1. Connected to frame 20b and thence to cylinder 21b as shown is frame 25, the position of frame 25 being adjustable with respect to cylinder 21 by means of threaded rod 26 or other suitable arrangement.

Mounted on frame 25 and in slidable relation as shown to fixed rods 28 and 29 is a varnish or liquid dispensing system 27 consisting of tubes as shown having at the extremities thereof dispensing or drip nozzle heads 30, 31 and 32 as shown for applying varnish to the inner and outer peripheries of the coils 10. Conduit 33 has a similar nozzle arrangement at its extremity which is not shown and also inside the stator position for dispensing varnish. The varnish is supplied through conduits 36 and 37 from any suitable source 35 which is actuated as by valve 38. A flexible blade 34 as of rubber or other flexible material is also mounted on the dispensing structure and is provided to bear against the inner periphery of the stator for the purpose of wiping varnish smoothly on this surface. Infrared sensing means 39 is directed as shown at a coil end surface, such sensor or detector being connected as shown to control element and time sequence means 40 having the preheat temperature preset as on dial 41. Sensor 39 is connected through relays, not shown, in control and time sequence means 40 to adjust the electric power to power supply means 11 in accordance with preset valves as on dials 41, 42 and 43. Control 40 also contains a time sequence operating means as provided by a conventional cyclic controller or clockwork and switches or equivalent which serves to apply power for the required period of time to the various motive elements and also the resistance heating current to the coils, the latter varying in response to the signal received from infrared sensor 39. The time sequence mechanism also serves to actuate the hydraulic cylinder 21b positioning the manually placed rotor in treating position and positioning the varnish dispensing heads for operation. After the preheat time has expired, the time sequence means actuates valve 38 to turn on the supply of varnish and switches control of the current to the infrared process control temperature indicated at 42 for the again preselected period of time, this temperature likewise being controlled by means of infrared sensor 39. When the required treatment time has elapsed, control system 40 switches the current to that required for the baking of the varnish for the required period of time after which the time sequence means deenergizes the system and retracts the varnish applicator system 27 and stop 19, the stator being removed and the next structure put in place. The cycle can be changed to suit any particular time sequence required. Control 44 serves to select the proper amount of varnish for any particular structure to be coated and it or another switch can be used to actuate the apparatus.

Referring to FIG. 2, there is shown an adaptation of the present equipment for treating wound stators which are mounted within an outer frame. In this instance it will be noted that the only change from the apparatus of FIG. 1 is in that the stator 8 is mounted within an outer frame 45 which latter extends over the ends of the coils 10 so that one of the dispensing nozzles 47 has a reversed extremity for applying varnish to the coil 10 underneath the outer stator frame 45. The stator as a whole is mounted in frame 46 for treatment.

While the control system for the embodiment of the apparatus shown is electrical and is connected as shown, it will be realized that other mechanical means may be provided in well known manner for providing all motions or movements which are required in the apparatus. Likewise, the time sequence means may be operated in any well known manner.

In operation, then, the stator to be impregnated is placed as shown on rolls 1 against fixed stop 17. The time sequence means 40 is set to select the proper temperature at 41, 42 and 43 for preheat, in-process heating and baking and at 44 to select the proper amount of varnish for the stator to be treated. With the timer 40 actuated to the desired preheat temperature and time, power is supplied to motor 5 and 14 to rotate stator 8 and power supply conductors 16 while resistance electrical current is being applied to the stator coils. Also actuated at this time by the time sequence means is hydraulic cylinder 21a which moves stop 19 to hold stator 8 in position in cooperation with stop 17. The varnish dispensing means 27 is also moved by cylinder 21b into dispensing position as shown in FIG. 1. During the preheat cycle, the set temperature of the coils is sensed by infrared detector or sensor 39 which controls through relays the electrical current input to coils 10 and hence their temperature. At the end of the preheat period, time sequence means 40 switches the electric power input to coils 10 and the infrared sensor to the preselected treating temperature which is then maintained during the treating cycle. At this time the amount of varnish preset by dial 44 is dispensed onto the stator.

When the proper amount of resin has been delivered as selected on dial 44, the time sequence means switches the electric current control and the infrared detector 39 to the proper selected baking temperature and time during which the proper electrical current is supplied through conductors 16 to the coil 10 as controlled by infrared sensor 39. At the end of the bake period, the time sequence means turns off the electric power supply and actuated hydraulic cylinder 21a and 21b to withdraw the varnish applicators and the movable stop for removal of the stator. It will be realized that the dispensing system can be alternatively arranged for positioning and withdrawal before and after the dispensing cycle itself. It will also be apparent that the stator 8 need not be rotated after the varnish has gelled sufficiently.

In a typical coating and impregnation process for a No. 254 Nema Standard motor stator, about 0.6 pound of solventless varnish is used to provide the equivalent of two dips and bakes for prior art dip coating and impregnating processes. When a solid filled treatment equivalent to four dips and bakes by the old process is desired, about 1 pound of solventless varnish is used. One and one-half pounds of solventless varnish are used to give a solid filled coil plus overcoat or encapsulated motor coil for the most rugged surface.

While the invention has been described above particularly in connection with the coating and impregnation of motor stators, it will be realized that it can be used as well to coat or treat any structure desired including but not limited to rotors, transformer coils, solenoid coils and the like. While the invention is particularly useful in coating and impregnating structures which have random wound coils, it can as well be used to coat and impregnate stators which are equipped with form wound coils. The apparatus is also useful in the salvaging of old motor stators which, for one reason or another, have failed. Such stators can be conveniently mounted in the apparatus shown and a temperature selected which is high enough to deteriorate the varnish in the coils after which the coils can readily be removed from the stator frame. This is as opposed to the former practice of heating the entire stator with danger of warping or, alternatively, forcefully tearing the coils from the stator with similar possibility of permanent damage to the structure.

As pointed out above, the present apparatus makes possible salutary savings in labor, apparatus and other facilities. Coils of normal size can readily be treated in about fifteen minutes as opposed to from six to twelve hours for usual prior art dip treatments. Labor costs are at least halved and a 75% reduction in floor space required for treating apparatus is not unusual. Additionally, facilities such as dip tanks, large stocks of resin and heating ovens and the like are not required. There is, additionally, little or no in-process inventory required. Particularly where solventless varnishes are used, the fire hazard is largely eliminated and even where solvent varnishes are used, this hazard is substantially reduced. The present invention is particularly characterized by the fact that the stator frame need not in itself be heated, such heating being essentially confined to the coils themselves, thus making the structures more readily handleable for processing.

I claim:

1. In apparatus for impregnating a coil-wound structure with a heat-curable liquid—
    (a) means for rotating said structure, (b) electric power transmission means, including electrical conductors directly connected to said coils, to resistance heat said coils, said electric power transmission means being arranged to rotate synchronously with said structure, (c) infrared sensing means to sense the temperature of said coils, (d) means connected to a heat-curable liquid supply and movable with relation to said structure to apply said liquid to said structure, and (e) time sequence means connected to control said resistance heating means in response to signals from said infrared sensing means and control said rotating means.

2. Apparatus as in claim 1 wherein said rotating means frictionally engages said structure for rotation thereby.

3. Apparatus as in claim 1 wherein said rotating electric power means delivers alternating current.

4. Apparatus as in claim 1 wherein said rotating electric power means delivers direct current.

5. Apparatus as in claim 1 wherein said time sequence means also controls the flow of said liquid.

6. The process of impregnating a coil-wound structure with a heat-curable liquid which comprises (a) rotating said structure, (b) heating said coils by electric resistance through electrical conductors directly connected to said coils and rotatable in synchronism with said structure, (c) sensing and controlling the temperature of said coils by infrared detecting means connected to control means for the electric resistance heating current, (d) drip applying a heat-curable liquid to said coils, and (e) curing said heat-curable liquid through the medium of said electric resistance heating.

References Cited

UNITED STATES PATENTS

| | | | |
|---|---|---|---|
| 2,231,695 | 2/1941 | Vedder | 219—502 |
| 2,438,160 | 3/1948 | Green | 219—502 X |
| 2,442,183 | 5/1948 | Stearns | 117—93.2 X |
| 2,561,092 | 7/1951 | Bell. | |
| 2,561,982 | 7/1951 | Hanna et al. | 117—119.6 X |
| 2,572,515 | 10/1951 | Poole et al. | 117—119.6 |
| 2,574,686 | 11/1951 | Brown | 117—105.4 |
| 2,640,137 | 5/1953 | Ketchledge | 219—502 X |
| 3,007,810 | 11/1961 | Hobrock | 118—318 X |
| 3,177,844 | 4/1965 | Lins | 118—49 X |

ALFRED L. LEAVITT, Primary Examiner

J. H. NEWSOME, Assistant Examiner

U.S. Cl. X.R.

117—49, 93, 105.4, 128.4; 118—5, 8, 315, 620; 219—492, 502